United States Patent [19]
Haake et al.

[11] Patent Number: 6,164,837
[45] Date of Patent: Dec. 26, 2000

[54] INTEGRATED MICROELECTROMECHANICAL ALIGNMENT AND LOCKING APPARATUS AND METHOD FOR FIBER OPTIC MODULE MANUFACTURING

[75] Inventors: John M. Haake, St. Charles, Mo.; Mark W. Beranek, Bellevue, Wash.

[73] Assignee: McDonnell Douglas Corporation, Saint Louis, Mo.

[21] Appl. No.: 09/223,028

[22] Filed: Dec. 30, 1998

[51] Int. Cl.[7] ....................................................... G02B 6/36
[52] U.S. Cl. ................................. 385/90; 385/88; 385/89; 385/91; 385/92
[58] Field of Search .................................. 385/90, 91, 92, 385/49, 88, 89

[56] References Cited

U.S. PATENT DOCUMENTS

| | | | |
|---|---|---|---|
| 4,720,163 | 1/1988 | Goodwin | 385/90 |
| 4,844,581 | 7/1989 | Turner | 385/91 |
| 5,007,700 | 4/1991 | Albares | 385/38 |
| 5,080,458 | 1/1992 | Hockaday | 385/14 |
| 5,553,183 | 9/1996 | Bechamps | 385/95 |
| 5,602,955 | 2/1997 | Haake | 385/136 |
| 5,606,635 | 2/1997 | Haake | 385/53 |
| 5,692,086 | 11/1997 | Beranek et al. | 385/94 |
| 5,745,624 | 4/1998 | Chan | 385/91 |
| 5,870,518 | 2/1999 | Haake et al. | 385/90 |
| 5,881,198 | 3/1999 | Haake | 385/136 |
| 5,896,481 | 4/1999 | Beranek et al. | 385/90 |

OTHER PUBLICATIONS

Dhuler, V. et al., "Microsystems for Three Axis Active Fiber Alignment", paper presented at Solid–State Sensor and Actuator Workshop, Hilton Head Island, South Carolina, Jun. 8–11, 1998, pp. 277–280.

"MEMS Active Fiber Microactuator", Semiconductor International, Dec. 1997, p. 32.

*Primary Examiner*—Cassandra Spyrou
*Assistant Examiner*—Leo Boutsikaris
*Attorney, Agent, or Firm*—Westerlund & Powell, P.C.

[57] ABSTRACT

An apparatus and a method for aligning an optical fiber with an optoelectronic device inside an optoelectronic package using an internal automated micro-aligner and internal solder heater means for locking the optical fiber in a precisely aligned position with the optoelectronic device.

15 Claims, 9 Drawing Sheets

FIG.8

INTEGRATED MICROELECTROMECHANICAL ALIGNMENT AND LOCKING APPARATUS AND METHOD FOR FIBER OPTIC MODULE MANUFACTURING

FIELD OF THE INVENTION

The present invention relates to manufacturing of optoelectronic devices, and in particular, optical fiber locking and alignment.

BACKGROUND OF THE INVENTION

The manufacture of optoelectronics modules, such as optoelectronic receivers and optoelectronic transmitters, requires that an optical fiber be properly aligned and fixed in an optical subassembly. In an optoelectronic receiver, a fiber is aligned with an optical detector, typically a PIN photodiode. In an optoelectronic transmitter, an optical fiber is aligned with a light-emitting diode (LED) or laser diode. A goal of optical alignment is to minimize the amount of attenuation within the subassembly. The alignment of the fiber optic member with the LED, laser diode, or photodetector is a critical step in the manufacture of an optoelectronic hybrid package. The end of an optical fiber is commonly referred to a "fiber pigtail." The arrangement whereby a fiber interfaces with an optoelectronic device to form a hybrid optoelectronic package is commonly referred to as a "fiber-pigtailed" hybrid package. The process for interfacing the fiber to the package is referred to "pigtailing."

The methods used to lock optical fibers inside of any type of optoelectronic packages must be reproducible, and the materials used must be reliable. Further, a successful packaging technique must achieve precise optical fiber locking. The methods, apparatus, and materials used must produce highly reliable optoelectronic packages. As discussed below, current techniques have not sufficiently addressed these demands.

Some prior art methods of attaching an optical fiber inside of an optoelectronic package utilize a liquid epoxy to attach the optical fiber to a substrate. Since the curing of epoxy can cause movement of the fiber. In order to ensure proper positioning, alignment of the fiber must be maintained during the solidification process. One disadvantage of epoxy is that it takes a relatively long period of time to fully cure, at least in the context of joining precisely aligned optical fibers, which increases assembly time and alignment requirements. Also, epoxy does not maintain its strength over wide temperature ranges, thereby limiting the environments within which it can be used.

Some methods of attaching an optical fiber inside of an optoelectronic package use high melting point bonding materials, such as silicon. The use of high melting point bonding materials limits assembly operations before the fiber-locking is completed.

An alternative to using epoxy and expensive, low melting point materials to lock optical fibers inside of optoelectronic packages is to use solder as the bonding medium. Since some materials tend to degrade during heating, the use of solder requires the employment of a method of alignment that can be completed rapidly in order to limit the amount of heat applied and permit the resulting bond to rapidly cool. Some prior art systems that use solder as a bonding medium employ thermocouples to provide feedback regarding the amount of heat created within the optoelectronic package. In the case of small optoelectronic packages, the use of thermocouples may not be practical. It is desirable therefore to provide a method of soldering that does not employ thermocouples and, preferably, does not require temperature feedback.

U.S. Pat. No. 5,692,086 describes an optoelectronic package including an optical fiber cable assembly and feedthrough assembly which provides high performance and high reliability optical fiber alignment, locking and sealing. The package includes a housing having a sidewall with an aperture therethrough and a floor with a substrate thereon. An optical fiber is fed through a nose tube into the package. The fiber is selectively metallized at the end which is within the housing. A solder lock joint is provided on a substrate on the package floor preferably of a reflowed solder preform, such as a SnAg-based or Sn-Sb-based solder. This reflowed solder preform surrounds at least part of the metallized portion of the fiber so as to hold the fiber in its desired position, in alignment with an optoelectronic device in the package. A solder seal joint containing Au and Sn, such as 80Au20Sn forms a hermetic seal between the aperture and the fiber. While the resulting optoelectronic package has high reliability and performance, the method of manufacture is slow and labor-intensive. It is desirable to provide a similarly reliable package using an automatic alignment and locking method and apparatus that are suitable for use in a commercial manufacturing environment.

U.S. Pat. No. 5,745,624, the entire teachings of which are incorporated herein by reference for all purposes, describes a method and apparatus for precisely aligning and bonding, viz. soldering, an optical fiber inside an optoelectronic module utilizing an external alignment subsystem located outside the module housing to align the fiber to an optoelectronic device. An internal thin film heater, located inside the module housing, is used as the heat source for melting the solder. Power is applied to the heater to melt the solder via an external computer controlled power supply located outside the module housing. The alignment of the optical fiber with the optoelectronic device involves use of an external manual alignment subsystem to effect coarse alignment. The manual alignment subsystem is mounted on a bracket which has its position controlled by an automated micropositioning stage to effectively control fine x-, y- and/or z-axis positioning of the fiber. Due to the external alignment mechanisms required for fine alignment, the U.S. Pat. No. 5,745,624 system can only be implemented in manufacturing environments where such external alignment equipment is available, and this factor limits the versatility of the system.

U.S. Pat. No. 5,602,955 shows a microactuator which controllably positions an optical fiber without the need for heating during alignment thereby preventing misalignment of adjacent optical fibers. The microactuator of U.S. Pat. No. 5,602,955 is bimorphic in nature, and it precisely aligns an optical fiber within a hermetically sealed package, such as a standard 14-pin hermetic butterfly package, in which optoelectronic devices are typically disposed. U.S. Pat. No. 5,602,955 requires a separate precision alignment housing (PACH) structure into which the microactuator has to be placed, which is undesirable. Also, while the microactuator of U.S. Pat. No. 5,602,955 provides a significant improvement over previous active fiber microactuator technologies, further improvements are nonetheless desired to reduce costs of opto-electronic hybrid manufacturing processing and to open-up opportunities in all-optical photonics applications.

It is an objective of the present invention to align and lock optical fibers inside of optoelectronic packages in a versatile manner, permitting in-the-field implementations if desired or necessary, by employing a total integrated solution in which micro-alignment and fiber heating-fixing are achieved inside the optoelectronic package in an automated, reliable, and repeatable manner. The present invention is directed to providing such an apparatus and method.

SUMMARY OF THE INVENTION

This invention meets the above and other objectives by providing an automatic micro-alignment and locking apparatus and method which precisely aligns a fiber-optic or micro-optic device using a micro-aligner subsystem located inside an optoelectronic package and then locks the fiber-optic device in its precisely aligned position.

In accordance with one embodiment of this invention, there is a system for aligning an optical fiber with an optoelectronic device housed inside an optoelectronic package and locking the optical fiber in place after being brought into precise alignment with the optoelectronic device, in which a micro-aligner subsystem is positioned inside an optoelectronic package enclosure containing an optoelectronic device and a heater in which a solder preform is attached atop the resistor. The heater preferably is a thin metallic resistor/heater. The solder preform is positioned laterally between the optoelectronic device and the micro-aligner subsystem, and the solder preform can be rendered molten by supplying electrical current to the heater to generate sufficient heat such that the solder's melting temperature is reached. The optical fiber, while secured upon the micro-aligner subsystem, is positioned adjacent the solder preform such that the molten solder comes into contact with the optical fiber. While the solder is rendered molten, the optical fiber is aligned with the optoelectronic device by movements induced to the fiber by the micro-aligner subsystem. Preferably, such alignments of the optical fiber are executed before and during the time period that the solder is rendered molten to maximize the precision of the alignment with the optoelectronic device. Once the optical fiber is precisely aligned with the optoelectronic device using the micro-aligner subsystem, the solder is resolidified to form a solder lock joint. The solder can be resolidified by discontinuing the electrical current flow to the heater and permitting the molten solder to cool and solidify, thereby locking the precisely aligned optical fiber in place. Further, even after solidifying the solder, the micro-aligner subsystem is still capable of inducing some degree of movement to a portion of the optical fiber that is not locked in solder, if desired or appropriate. The optoelectronic package referred to herein includes the optoelectronic module housing and contents thereof.

In accordance with further aspects of this invention, the system includes a microprocessor having a monitor and an input device. The microprocessor controls the alignment of the optical fiber and electrical current supplied to the resistor. The microprocessor also receives data from an instrument that measures the amount of light transmitted between the optical fiber and the optoelectronic device, and this data is analyzed by the microprocessor and appropriate command signals are sent from the microprocessor to the micro-aligner subsystem to automatically control the micro-aligner subsystem such that the optical fiber is micro-positioned so as to increase the amount of light passing between the optical fiber and the optoelectronic device while the solder preform is in a molten state. Once the amount of transmitted light is satisfactorily enhanced in this manner, then solder is cooled, or permitted to cool, such that the re-solidified solder locks the optical fiber in its precisely aligned position relative to the optoelectronic device.

In one preferred embodiment of this invention, the micro-aligner subsystem includes an optical fiber holding means for receiving the optical fiber, in which the held optical fiber is independently movable in any of three orthogonal directions (i.e., x-, y- and z-directions) relative to the optoelectronic device. One exemplary micro-aligner subsystem useful for accomplishing this function has a carrier upon which the optical fiber is held, and the carrier is provided with first and second in-plane (viz., x-axis and y-axis) microactuators for inducing in-plane movement of the carrier and held optical fiber in respective first and second orthogonal directions along the surface plane of the carrier, and a third microactuator for inducing out-of-plane (viz., z-axis) movement of the carrier and held optical fiber in a third direction that is orthogonal to said first and second orthogonal directions. The carrier is positioned within a recess of a stationary alignment housing as defined by a base and upright sidewalls. The carrier includes first and second biasing means biased against sidewalls of the stationary alignment housing to thereby impose counter forces against which the respective first and second in-plane microactuators on the carrier must act and overcome (as well as the bending force of the optical fiber, the stiction/friction associated with moving the carrier across the surface of the base, the forces associated with the wire bonds and all other forces typically encountered in aligning and bonding optical fibers) to induce in-plane movement of the carrier relative to the optical device. When the first and second (in-plane) microactuators are at rest, the counterforce biasing means establish an equilibrium in-plane reference position of the unitary movable carrier in a corner of alignment housing. This three-axes active fiber micro-aligner subsystem enables the precise alignment of an optical fiber with the optoelectronic device.

In yet another embodiment of this invention, there is a method of using the aforesaid system of the invention for precisely aligning an optical fiber with an optoelectronic device inside an optoelectronic package.

The present invention permits both in-package alignment of a fiber-optic or micro-optic device and bonding of the fiber-optic or micro-optic device in its aligned position inside an optoelectronic package (module housing) in any of a manufacturing environment, in-the-field, or during a mission (i.e., remotely). The system includes an optical fiber affixing mechanism which does not require an external heat source such as a laser or micro welder. The inventive system also permits re-alignment and re-attachment of the fiber-optic and micro-optic device inside the package outside the manufacturing environment. This invention is potentially applicable to a "smart" system which remotely re-aligns and fixes (repairs) its optical circuit to achieve maximum throughput in its mission environment. The inventive system also permits many simultaneous alignments and bonding in a manufacturing environment and eliminates the need for an expensive external alignment and bonding systems to fabricate optoelectronic packages or modules.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

Corresponding reference characters indicate corresponding parts throughout the drawings.

DETAILED DESCRIPTION OF THE PREFERRED EMBODIMENTS

Figure 1:
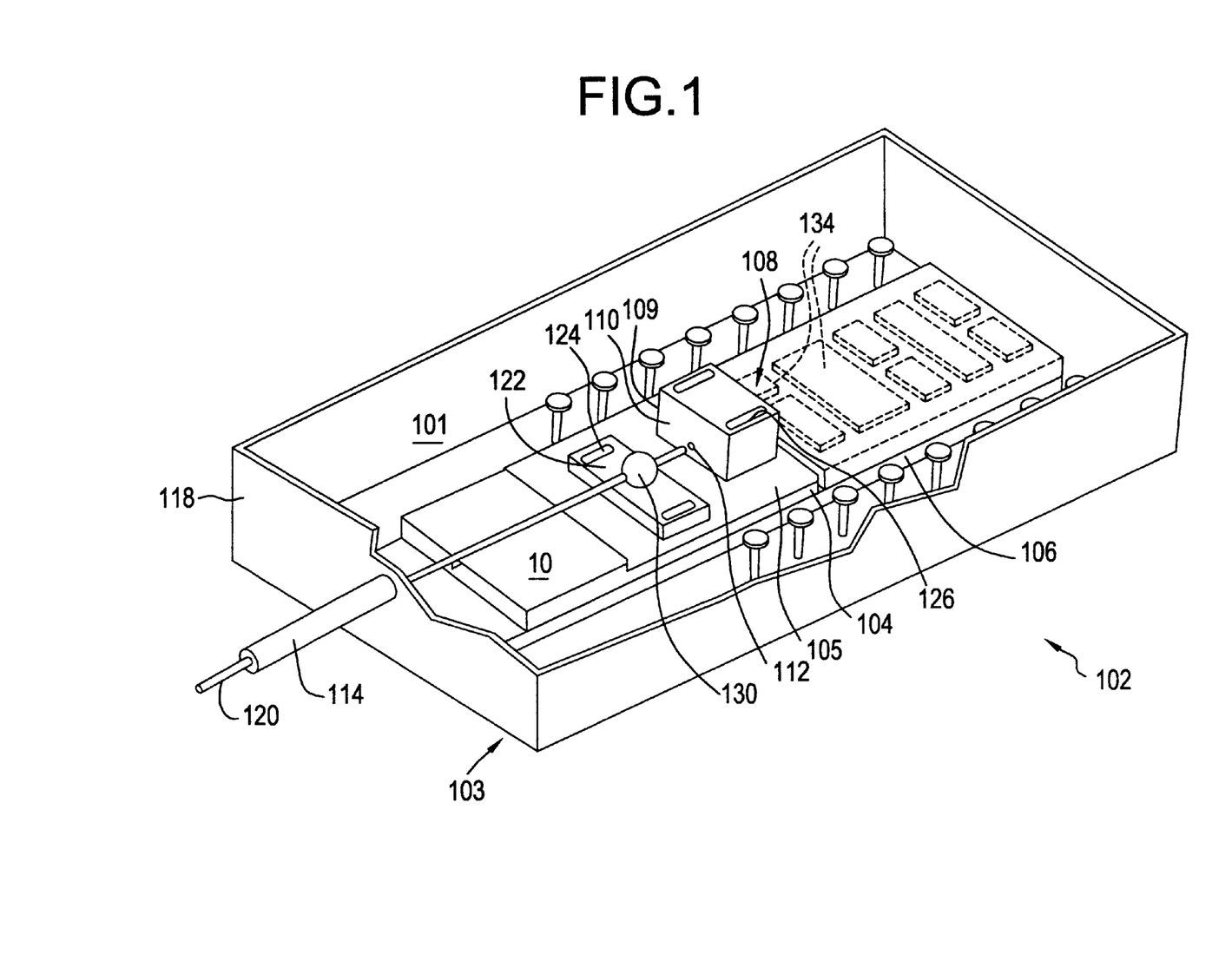
FIG. 1 is a pictorial diagram illustrating an optoelectronic hybrid package incorporating a fiber optic interface formed according to this invention.
Figure 2:
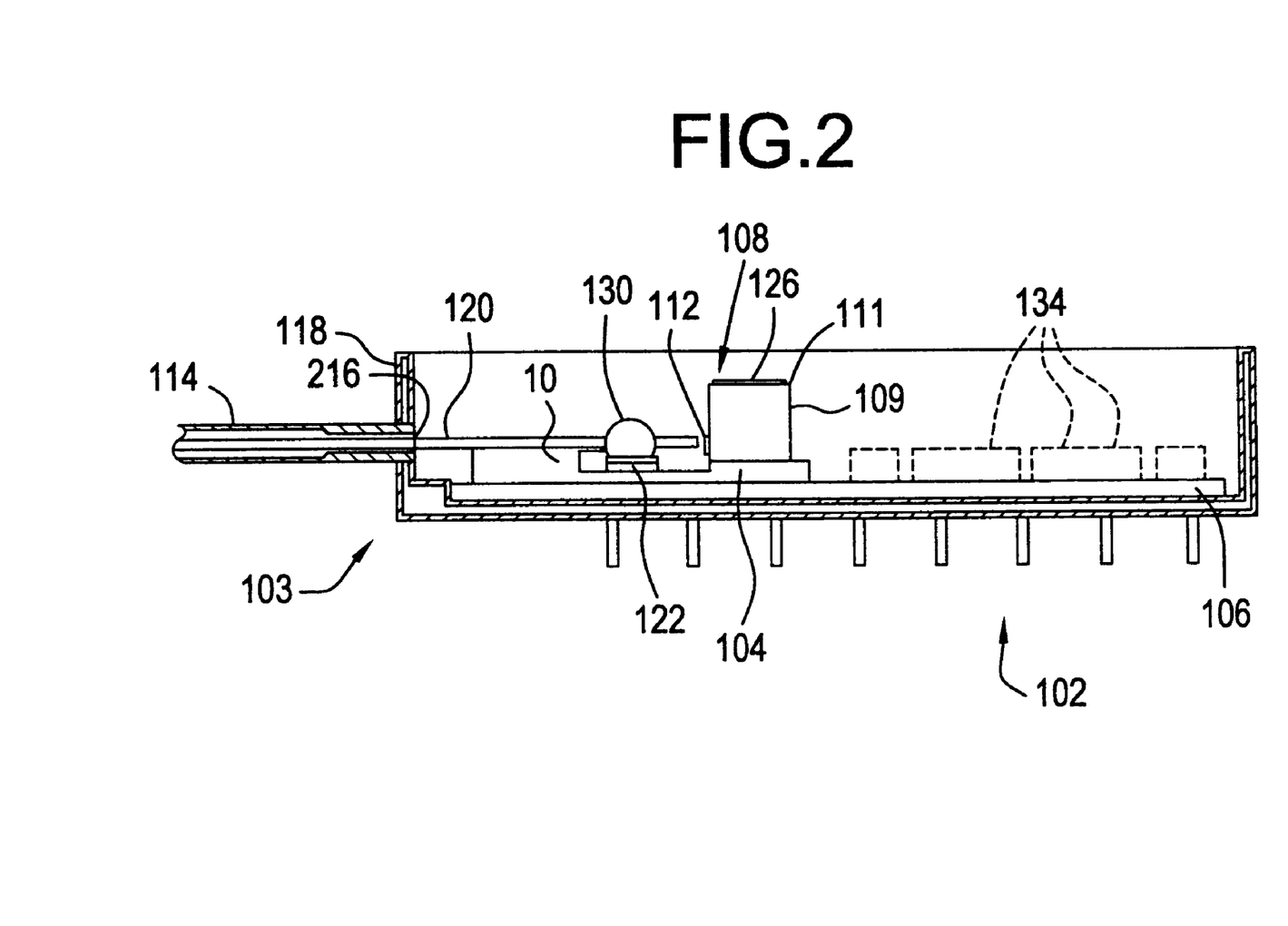
FIG. 2 is a longitudinal, cross-sectional side view of the optoelectronic hybrid package illustrated in FIG. 1.

FIG. 1 is a pictorial diagram illustrating an exemplary optoelectronic hybrid package 102 incorporating a fiber optic interface aligned and locked using the apparatus and method of the invention. FIG. 2 is a side view of the exemplary optoelectronic hybrid package illustrated in FIG. 1. The hybrid package 102 may be an optical receiver or optical transmitter, such as specified by the Aeronautical Radio, Inc. (ARINC) 636 standard. The following description of the preferred embodiment of the invention is based on the exemplary optoelectronic hybrid package 102 illustrated in FIG. 1 and FIG. 2. As will be appreciated, changes may be required for other types of optoelectronic packages.

The optoelectronic hybrid package 102 illustrated in FIGS. 1 and 2 includes an enclosure 101 defined by sidewalls 118 which a header assembly 103 having a device floor 106. A substrate 104 is mounted on the device floor 106, and the substrate forms an integral base for micro-aligner subsystem 10, device submount 108, and resistor/heater 122, each of which is described in greater detail below. The substrate 104 is preferably a ceramic substrate, which serves as a heat sink that disperses heat generated by electronic circuitry mounted on the substrate 104. The device submount 108 is mounted atop the substrate 104. The device submount 108 includes a block 109 and the optoelectronic device 112 mounted on a side 110 of the block 109. Two device terminals 126 reside on the top surface 111 of device submount 108, and the device terminals are electrically connected to the opto-electronic device 112. The optoelectronic device 112 is a light transmitter, such as a light-emitting diode (LED) or a laser diode, when the hybrid package 102 is an optical transmitter. Alternatively, the optoelectronic device 112 is a light detector, such as a PIN photodiode, when the hybrid package 102 is an optical receiver. In either case, a cylindrical hermetic feedthrough 114 leads to an aperture 216 formed in the package sidewall 118 in alignment with the optoelectronic device 112. The hermetic feedthrough 114 is preferably a KOVAR tube with a gold-plated interior that is braised to the sidewall 118 of the package. An optical fiber 120 extends through the hermetic feedthrough and the aperture 216. The hermetic feedthrough is more fully disclosed in U.S. Pat. No. 5,692,086, the subject matter of which is incorporated herein by reference. Preferably, the optical fiber 120 is a commercially available sleeved gold metallized optical fiber. The sleeving (not shown) is preferably a high-temperature plastic that is physically and chemically stable over a wide temperature range.

The optical fiber 120 is held in proper alignment by a fiber lock joint. In accordance with the invention, the fiber lock joint is formed by the liquefaction and solidification of a solder preform 130. As also described more fully below, when the lock joint is formed, the solder bonds to a thin film resistor/heater 122 located atop the substrate 104.

FIGS. 1 and 2 also illustrate the circuitry 134 housed within the hybrid package 102. The circuitry 134 is added after aligning and locking the optical fiber 120. Prior to installation of the circuitry 134, a hybrid package 102 is commonly referred to as an optical header assembly.

The present invention employs the internal micro-aligner subsystem 10 to effectuate precise optical alignment, i.e., on a micrometer level, of the optical fiber 120 and optoelectronic device 112.

Figure 3A:
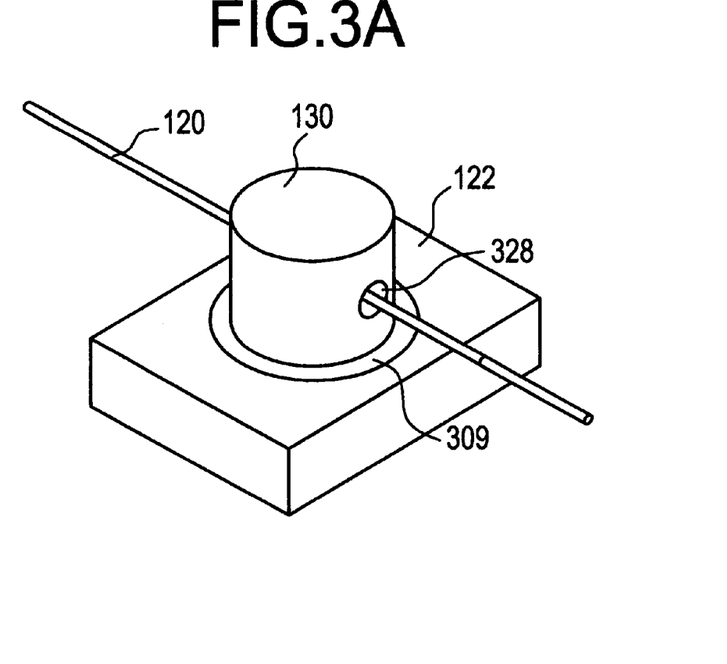
FIGS. 3A and 3B illustrate the sequence of insertion of a fiber through a solder preform and reflowing of the preform according to a preferred embodiment of the invention.
Figure 3B:
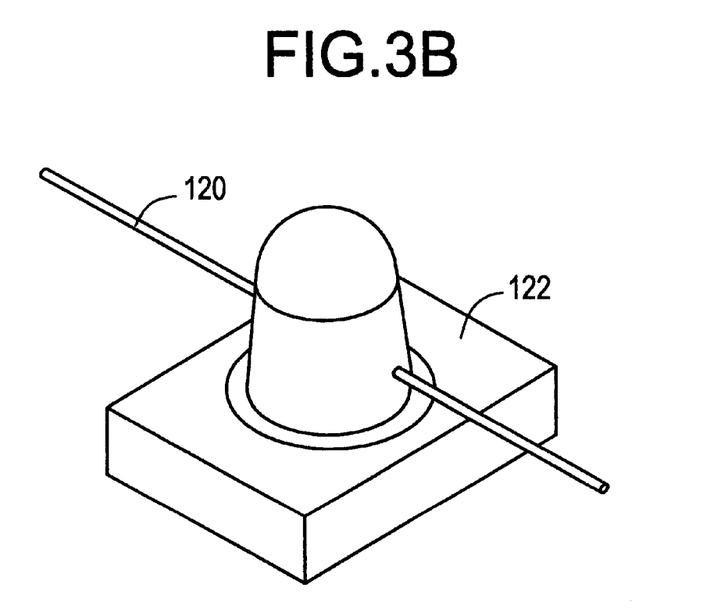

Referring now more particularly FIGS. 3A and 3B, the operation of the resistive heater 122 to melt solder of solder preform 130 and bond the fiber-optic 120 inside the optoelectronic module housing 102 is based on the descriptions set forth in U.S. Pat. No. 5,745,624, which teachings are hereby incorporated by reference. FIGS. 3A and 3B illustrate the optical fiber 120 passing through solder preform 130 both before and after alignment and reflow of the solder preform according to the invention. The solder preform 130 comprises a solid piece of solder, preferably SnAg solder, having a generally horizontal, approximately cylindrical aperture 328 extending through it. The aperture 328 is sized to receive an optical fiber 120 with enough space around the optical fiber 120 to permit for alignment of the fiber prior to melting the solder. As illustrated in FIG. 3A, the solder preform 130 can be a vertically oriented cylindrical shape with flat bottom and top surfaces, although other solder preform shapes such as rectangular shapes also are suitable. The flat bottom surface overlies on the heater resistor 122 in the position described above. The solder preform 130 optionally can rest on a pad 309 constituted by a thin gold layer formed on a nickel layer disposed on resistor 122. The solder preform must contain enough solder to produce a sufficiently strong fiber lock joint. In one embodiment, the solder preform 130 can contain approximately 25–35 mg of solder. Other specific details on the construction and choice of materials for resistor terminals 124 (FIG. 1) and the solder material used for solder preform 130 are taught in U.S. Pat. No. 5,745,624, which teachings are incorporated herein by reference.

In any event, an optical fiber 120 inserted through the aperture 328 in the solder preform 130 is aligned in the manner described above. Thereafter, the heater-resistor 122 is energized, causing the solder of solder preform 130 to melt and wick around in contact with the exterior surface of fiber 120, and out onto the metallized heater pad 309 to wet and bond to the heater pad 309. After completing precise alignment of the optical fiber with the optoelectronic device 112 as described in more detail elsewhere herein, the melted solder is permitted to cool and resolidify. The resolidified solder creates a fiber lock joint, as illustrated in FIG. 3B.

In addition to the concepts described and incorporated herein by reference from U.S. Pat. No. 5,745,624 relative to the resister/heater 122 and solder preform 130 operation, this present invention adds the following new inventive concepts for implementing a resistive heater-based fiber-optic soldering process inside an optoelectronic module. In the present invention, the heater 122 can be introduced into the enclosure 101 of the optoelectronic package 102 as a separate unit, i.e., not integral to the micro-aligner device 10, such that the heater 122 is adhesively bonded, e.g., soldered, to the substrate 104 that is shared with micro-aligner subsystem 10 and device submount 108. Alternatively, the heater can be arranged integral to the micro-aligner subsystem 10, i.e., fabricated on the same wafer as substrate 104 as the micro-aligner subsystem 10.

Figure 4:
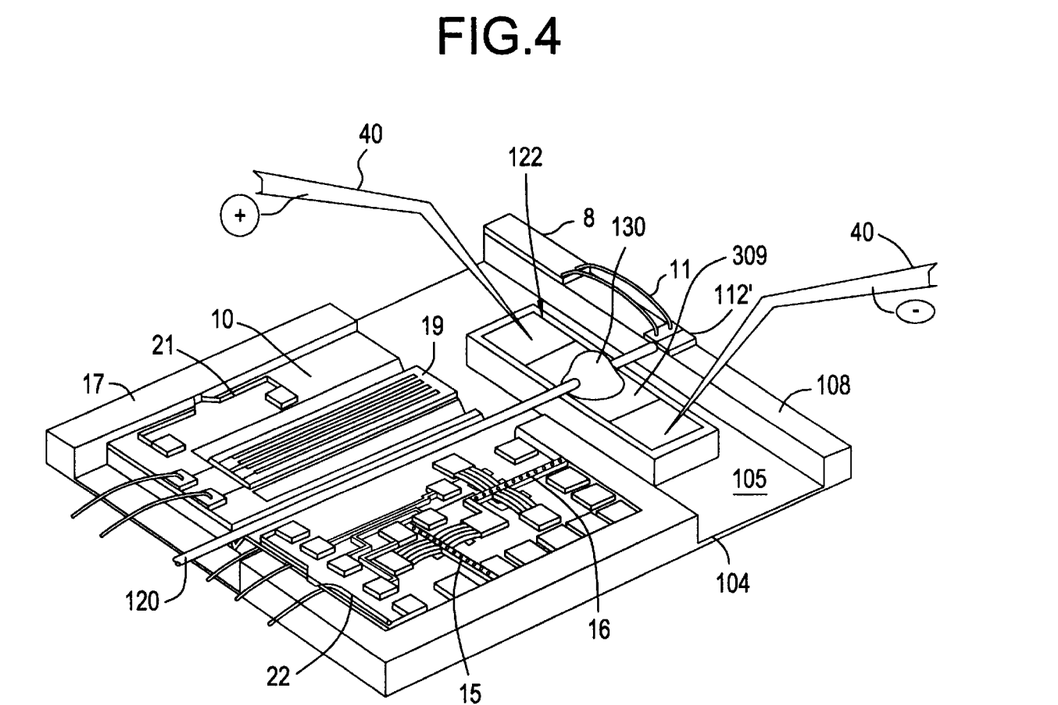
FIG. 4 is a perspective view of an integrated micro-aligner subsystem and solder preform bonding subsystem that can be used in optoelectronic hybrid package illustrated in FIG. 1.

FIG. 4 shows the basic layout of the a micro-aligner subsystem 10, optoelectronic device submount 108, and a resistor/heater 122 components of the system. These components can be integrally formed upon a common substrate 104, or, alternatively, separately affixed to device floor 106. The heater 122 can be electrically biased via external probes 400, such as shown in FIG. 4, to the melt the solder. Alternatively, the heater 122 can be electrically biased via internal wire bonds. The internal wire bonds are connected to adjacent heater control circuitry (not shown in FIG. 3), which can be either inside the optoelectronic module, or in an adjacent electronic package on the same printed circuit board where the optoelectronic module is residing. Similarly, the control circuitry for the microaligner subsystem 10 can be either inside the optoelectronic module, or in an adjacent electronic package on the same printed circuit board where the optoelectronic module is residing. Also, micro-aligner subsystem 10 includes an alignment frame housing 17, in-plane (i.e., x- and y-direction) micro-actuators 15 and 16, out-of-plane (i.e., z-direction) micro-actuator 19, and counter-force springs 21 and 22, which features are described in greater detail below in connection with FIGS. 5A, 5B, 6, 7A and 7B.

Once installed, the micro-aligner device 10 and heater 122 are hermetically sealed within the enclosure 101 inside the metal optoelectronic module housing 102 with a hermetic sealed cover by sealing techniques in the art. The hermetically sealed metal optoelectronic module housing is filled with inert gas, i.e., an oxygen-free atmosphere (e.g., nitrogen, helium, a helium-nitrogen mixture, an so forth) by a conventional technique. The inert gas atmosphere permits the solder to melt (or re-melt) or flow (or reflow) around the fiber-optic and wet (and/or re-wet) the fiber-optic sufficiently without oxide build-up on the solder joint. That is, if the in-package micro-aligner/micro-heater is hermetically sealed inside the optoelectronic module housing, then the in-package micro-aligner/micro-heater device of this invention enables a dry, no-clean re-alignment/re-soldering of a previously soldered fiber-optic or micro-optic device inside the package.

The micro-aligner/micro-heater device can also be used in the initial assembly of the optoelectronic device. In this case, the fiber 120 is first aligned with the diode laser device 108 inside the package 102. After alignment is complete, the heater 122 is activated to melt the solder preform 130 inside the package as described above. The micro-aligner subsystem 10 can be controlled via either internal or external circuitry. Likewise, the heater 122 can be controlled via either internal or external circuitry. Internal control circuitry offers the advantage of enabling remote re-alignment and fixing of the fiber-optic inside the package.

In aligning the optical fiber 120 with the optoelectronic device 112, the alignment system preferably employs a subsystem for measuring the amount of light transmitted between the optical fiber 120 and the optoelectronic device 112. The basic approach is to measure light transmitted from the optoelectronic device 112 into the optical fiber 120, or, alternatively, from the optical fiber 120 to the optoelectronic device 112, and appropriately manipulating the position of the optical fiber 120 using micro-aligner subsystem 10 as based on the light measurements to maximize the amount of transmitted light.

Figure 8:
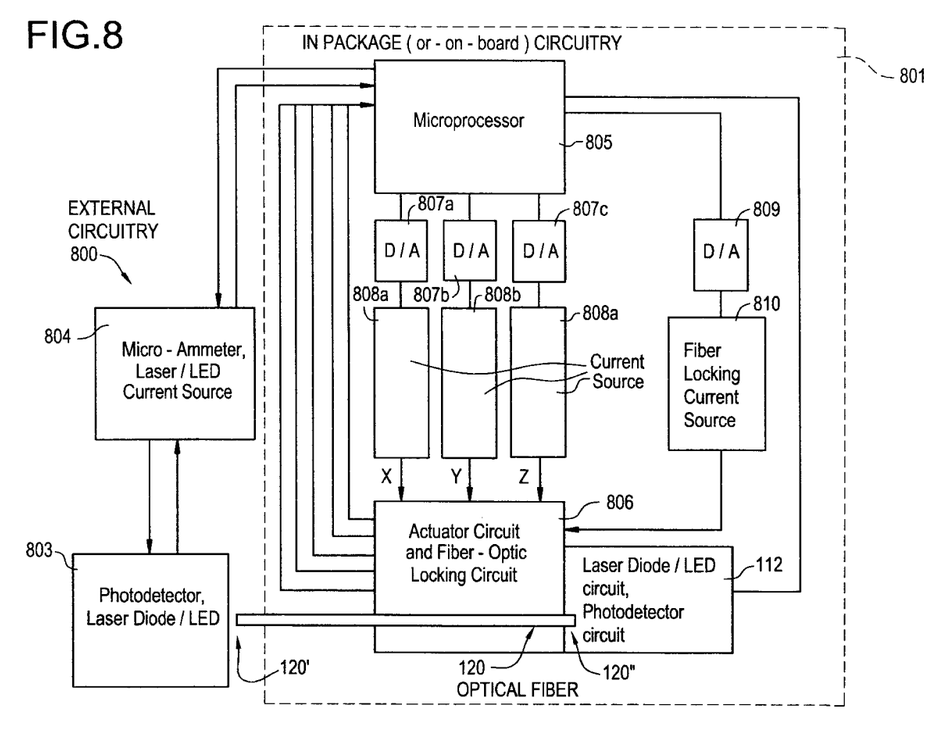
FIG. 8 is a block diagram of a light measuring subsystem of an automatic alignment and locking system for an optoelectronic transmitter according to an illustrative embodiment of this invention.

By way of illustration, FIG. 8 shows a block diagram for a suitable light measuring system where photodetector 803 and micro-ammeter 804 are provided for measuring the amount of light transmitted from a laser diode/LED 112 into the optical fiber 120. The photodetector 803 is optically coupled to the end 120' of the optical fiber 120 that is located outside package sidewall 118 (FIG. 1) and opposite to the other fiber end 120" that receives input light from optoelectronic device 112. The output of the photodetector 803 is connected to the micro-ammeter 804, and the micro-ammeter 804, in turn, produces output representative of the light received by photodetector 803 from the output of optical fiber 120 being aligned. The output of the micro-ammeter 804 is supplied to the microprocessor 805 in digitial form. Microprocessor 805 processes the light measurement information and sends appropriate commands to the actuator circuit 806 via digital/analog converters 807a, 807b, and 807c and corresponding current sources 808a, 808b, and 808c to direct the x, y and/or z-direction actuation of the microaligner subsystem 10. Once the optical fiber 120 is optimally aligned with the laser diode or other light transmitting device 112, then the microprocessor 805 sends a command signal to the fiber-optic locking circuit 806 via digital to analog converter 809 and fiber locking current source 810 effective to activate the heater 122 for solder preform 130. FIG. 8 generally indicates the external (800) and internal (801) light measuring equipment and circuitry relative to the enclosure 101 (FIG. 1) represented by the hatched lines. The optoelectronic device 112 also can be equipped with a photodetector circuit and the photodetector unit 803 can also be combined with a laser diode/LED light generating means, and the optical circuit of the light measuring scheme can be reversed.

Before the optical fiber 120 is precisely aligned with optoelectronic device 112 using micro-aligner subsystem 10, coarse alignment can be provided using a manually grippable tweezer-like device used to maneuver the optical fiber 120 from outside the enclosure 101 or by a manual alignment subsystem providing greater mechanical control, such as that described in U.S. Pat. No. 5,745,624, which teachings are incorporated herein by reference.

Figure 5A:
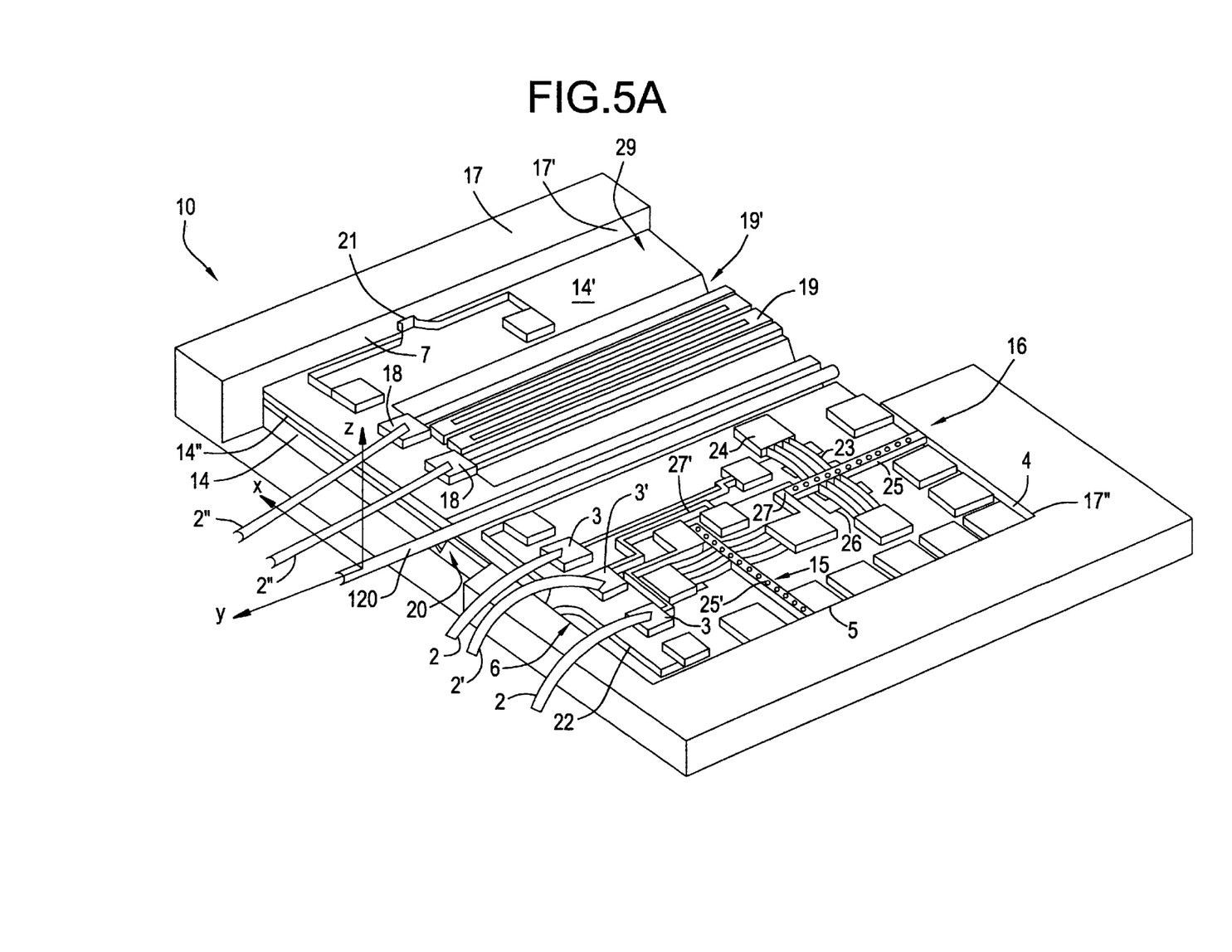
FIG. 5A is a perspective view of a micro-aligner subsystem used inside the optoelectronic package in accordance with one embodiment of the invention.

Referring now to FIG. 5A, the micro-aligner subsystem 10 incorporated within the optoelectronic package 102 is shown in more detail. The micro-aligner subsystem 10 must include an optical fiber holding means for receiving the optical fiber 120, and the micro-aligner must be able to manipulate the held optical fiber independently in any of three orthogonal directions (i.e., x-, y-, and z-axis directions) relative to the optoelectronic device 112 (FIGS. 1, 2, and 4) within precise submicron tolerances, preferably within about 10 $\mu$m or less. The micro-aligner subsystem 10 is made small enough to easily fit within enclosure 101, which may necessitate sizes of about 4 mm×4 mm×0.5 mm, or even smaller, for some opto-electronic packages, while being robust and durable enough to tolerate in-the-field utilizations and handling and the like.

In the illustrated, non-limiting embodiment of FIG. 4, the micro-aligner 10 controllably positions the optical fiber 120 to precisely align it with an associated optical device 112', which is illustrated as a laser diode but it also could be a LED or photodiode. The optical fiber 120 may be a single mode, multi-mode or polarization preserving optical fiber, although micro-aligner 10 is particularly well suited for precisely aligning single mode optical fibers. In addition, optical fiber 120 may have a lensed facet or a cleaved end facet without deviating from the scope of the invention. For sake of comparative illustration, FIG. 4 shows a laser diode 112' as surface mounted upon submount 108 where the laser diode 112' is electrically connected to conductor line 8 via wire bond 11, as compared to the different mount configuration of optoelectronic device 112 as generally shown in FIGS. 1 and 2.

As shown in FIG. 5A, micro-aligner 10 has a carrier substrate 14 upon which its various components are fabricated. The single mode optical fiber 120 is precisely attached in an optical groove 20 formed in carrier 14. The carrier substrate is a unitary body, and it rests on a base 9 of an alignment housing 17. The alignment housing 17 is a frame-like body disposed in fixed relation to an optoelectronic device 112 (112') shown elsewhere in FIGS. 1 and 4. For example, the alignment housing 17 includes sidewalls 17' upstanding from base 9 along four sides with openings provided in the sidewalls on two opposing sides of the alignment housing 17 to accommodate positioning of the optoelectronic device 112 (112') and the portion of the optical fiber 120 off the carrier 14. The size of the recess formed by the sidewalls 17' is selected to slightly exceed the dimensions of the carrier 14 while being close enough to permit spring biasing to be created between the sidewalls of the alignment support structure and the carrier, as will be described in greater detail below. In a preferred embodiment, the alignment housing will include four upright sidewalls 4, 5, 6, and 7 arranged on base 9 such that a pair of parallel sidewalls is provided normal to each of the x-direction (i.e., walls 5, 7) and the y-direction (i.e., walls 4, 6) that together with base 9 define a recess 29 therein that will receive carrier 14 for reasons that will become apparent from the following descriptions.

The alignment housing 17 is preferably formed of a thermally conductive material to serve as a heat sink for drawing heat from optoelectronic device 112 (112') shown elsewhere in FIGS. 1 and 4. In addition, the alignment support structure can also draw heat from the underside of the carrier 14. By drawing heat from the optical device and/or carrier, the carrier and, in turn, the optical fiber 120 can be maintained at a predetermined constant temperature such that the alignment of the optical fiber is not altered or otherwise affected due to temperature fluctuations. In one exemplary embodiment, the alignment support structure is comprised of a metallic material, such as copper or nickel. The alignment support structure can be a micromachined cavity or box formed by a variety of processes, such as by LIGA processing methods for making alignment structures, such as those described in U.S. Pat. No. 5,602,955, which teachings are incorporated herein by reference. In this way, the alignment housing 17 has the sidewalls 17' and base 9 formed as an integral body. Further, and although not required, the alignment housing 17 optionally can be formed as an integral component along with substrate 104 upon which the heater 122 and device submount 108 are reposed (see FIGS. 1 and 2).

The carrier 14 sits on the base 9 of the alignment housing structure 17 by virtue of gravity and the springs 21, 22, which act to hold it in housing recess 29, and it is not bonded or otherwise attached thereto. Thus, carrier 14 is freely slidable over base 9 once any inter-frictional forces therebetween are overcome. In one preferred embodiment, substrate 14 comprises a layer of polished silicon. Other semiconductor materials that can be micromachined are also usable for substrate 14. The side length dimensions and thickness of carrier 14 can be relatively small, for example, the side dimensions each can be less than or equal to 5 mm and thickness can be approximately 0.5 mm.

It is to be understood that groove 20 can be formed by a variety of processes, such as etching, and may have a variety of other cross-sectional shapes without deviating from the scope of the invention. For instance, channel 20 can be a groove having a v-shaped cross section with opposing side walls defining an angle of approximately 55° with respect to the top surface 14' of substrate 14, such as an optical fiber-holding groove of the type described in U.S. Pat. No. 5,602,955, which teachings are incorporated herein by reference. For a bulk silicon wafer carrier, this type of groove can be formed by an anisotropic wet etch of the wafer surface with potassium hydroxide, or anisotropic plasma etch, and the like, according to techniques well known in the semiconductor processing arts, such as by anisotropic etching in the carrier substrate 14 in two different directions or orientations, such as <110> and <100>. A groove also can be formed by laser cutting of the wafer surface. Preferably, the V-shaped groove would be deep enough so that optical fiber is initially slightly below (e.g., approximately 5 μm below) its final aligned position.

Alternatively, in lieu of groove 20, an LIGA channel can be defined in its body for receiving and holding the optical fiber 120 in a fixed relation thereto. An optical fiber bonding agent or solder, for example, could be used to secure optical fiber 120 within an LIGA channel to maintain it in a fixed position relative to carrier 14. For example, an optical fiber bonding agent, such as polymeric adhesive, Gould GlassSolder# bonding agent, or a high temperature solder, such as tin/silver eutectic alloy solder, can be used to bond optical fiber 120 to carrier substrate 14. As known to those skilled in the art, optical fiber 120 is preferably metallized with titanium, platinum, gold, or nickel and gold, for example, which improves the bond within an LIGA channel. Whether holding means 20 is a groove or LIGA channel, carrier substrate 14 constitutes a carrier for holding optical fiber 120 in a fixed relation thereto.

The aforesaid active fiber micro-aligner 10 includes first and second in-plane actuators 15 and 16 for effecting the in-plane alignment in the orthogonal in-plane (x-and y-axes) directions of the optical fiber 120 held by the micro-aligner 10, while a third actuator 19 is used for effecting the out-of-plane (z-axis) alignment of the optical fiber 120 held by the micro-aligner 10. The preferred constructions of the in-plane and out-of-plane microactuators are described in greater detail below.

Referring to FIG. 5A, in order to induce in-plane alignment of optical fiber 120 as held on carrier 14 with an optoelectronic device, viz. devices 112 or 112' shown in FIGS. 1 and 4, the micro-aligner 10 includes two orthogonally positioned in-plane actuators, including x-direction actuator 15 and y-direction actuator 16, respectively, which are adapted to move carrier 14 relative to stationary alignment housing 17 and an optoelectronic device 112 (112') in respective planar orthogonal x- and y-directions respectively, extending in a plane defined by the surface 14' of substrate 14. In turn, this permits optical fiber 120 to be precisely aligned with an associated optoelectronic device 112 (112'), in the in-plane directions.

In one embodiment, x-direction actuator 15 and y-direction actuator 16 are thermally actuated arch beam actuators. More specifically, and still referring to FIG. 5A, when such a thermally actuated arch beam actuator 16 is activated, its beam 25 moves relative to the stationary alignment housing 17 and its sidewalls 17' and base 9. Beam 25 moves along an orthogonal in-plane direction 16" (see FIG. 6), which is opposite to the y-direction indicated in FIG. 5A, until beam 25 comes into contact with the immediately confronting stationary sidewall 4 among sidewalls 17' of alignment housing 17 and creates an opposing force pushing the carrier 14 away from the sidewall 4 in the y-direction. The other in-plane thermally actuated arch beam microactuator 15 interacts in a similar manner via its beam 25' with another sidewall 5 among sidewalls 17' of the alignment housing 17 to push carrier 14 in an x-direction that is orthogonal to the y-direction.

Figure 5B:
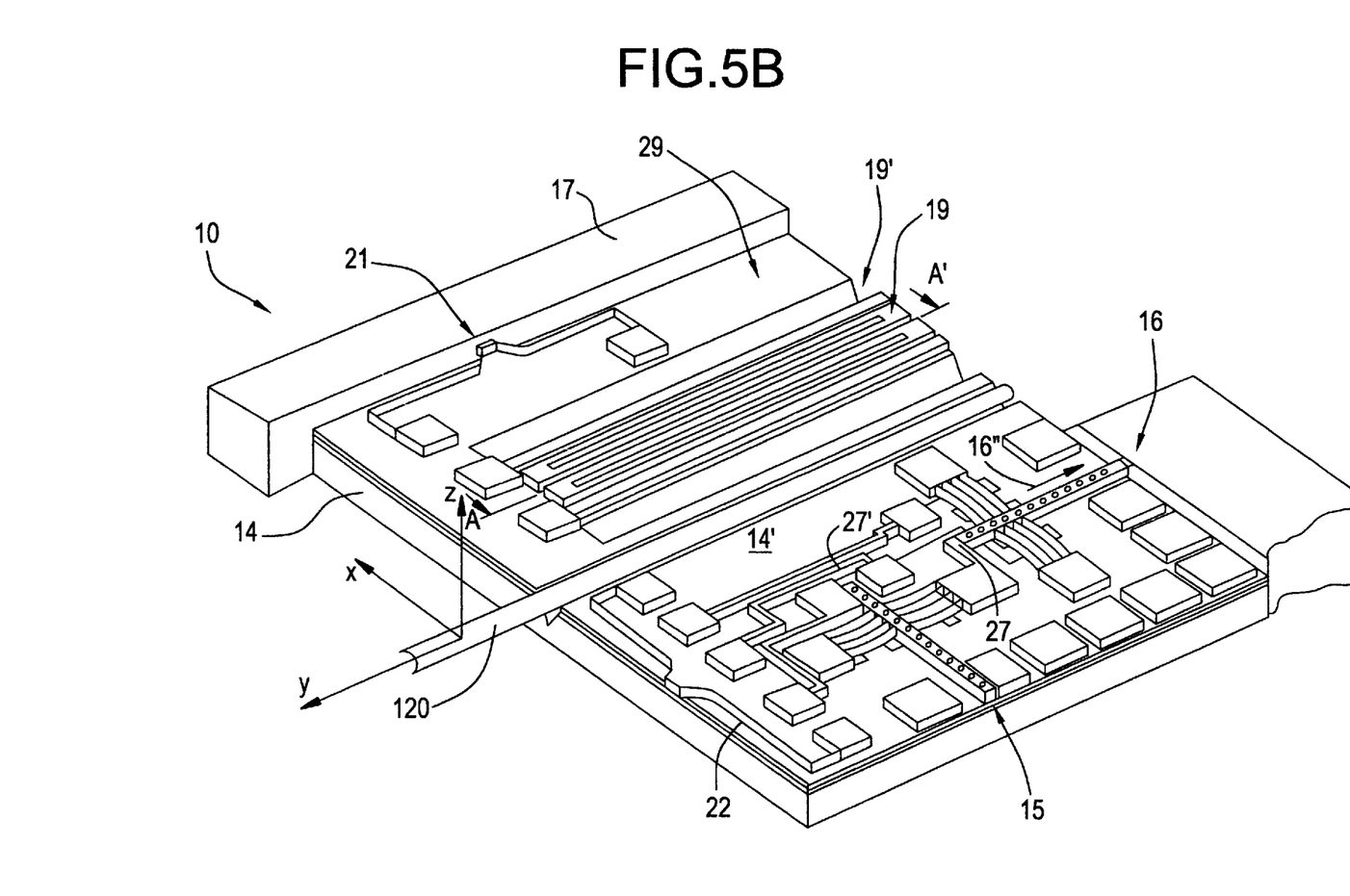
FIG. 5B is another perspective view of the micro-aligner subsystem according to FIG. 5A showing including a cut-away of a portion of the alignment housing structure thereof.

The counterforce return springs 21 and 22 provide counter biasing forces that the x-direction actuator 15 and y-direction actuator 16 must act against and ultimately overcome, respectively, when activated to impart in-plane movement to carrier 14. Counter force spring 22 is shown in more detail in FIG. SB, which cuts away a portion of the alignment housing sidewalls 17' for sake of illustration only. The counterforce springs 21 and 22 are biased against respective stationary walls 6 and 7 of alignment housing 17 to create respective biasing forces pushing the carrier 14 back into reference corner 17" of alignment housing 17 when the in-plane actuators 15 and 16 are both de-activated, and the carrier 14 is held in place as wedged into corner 17" as the equilibrium condition of the micro-aligner 10 until either or both of the in-plane actuators 15 and/or 16 are again activated. More specifically, when either or both are actuated, arch beam actuators 15 and 16 overcome the counter bias force provided by springs 21 and 22, respectively, as well as the frictional forces between carrier 14 and the alignment housing base 9, the bending moment of fiber 12, and the bending moments of the leads 2 connected to pads 3, to move carrier 14 in the desired in-plane direction.

Figure 6:
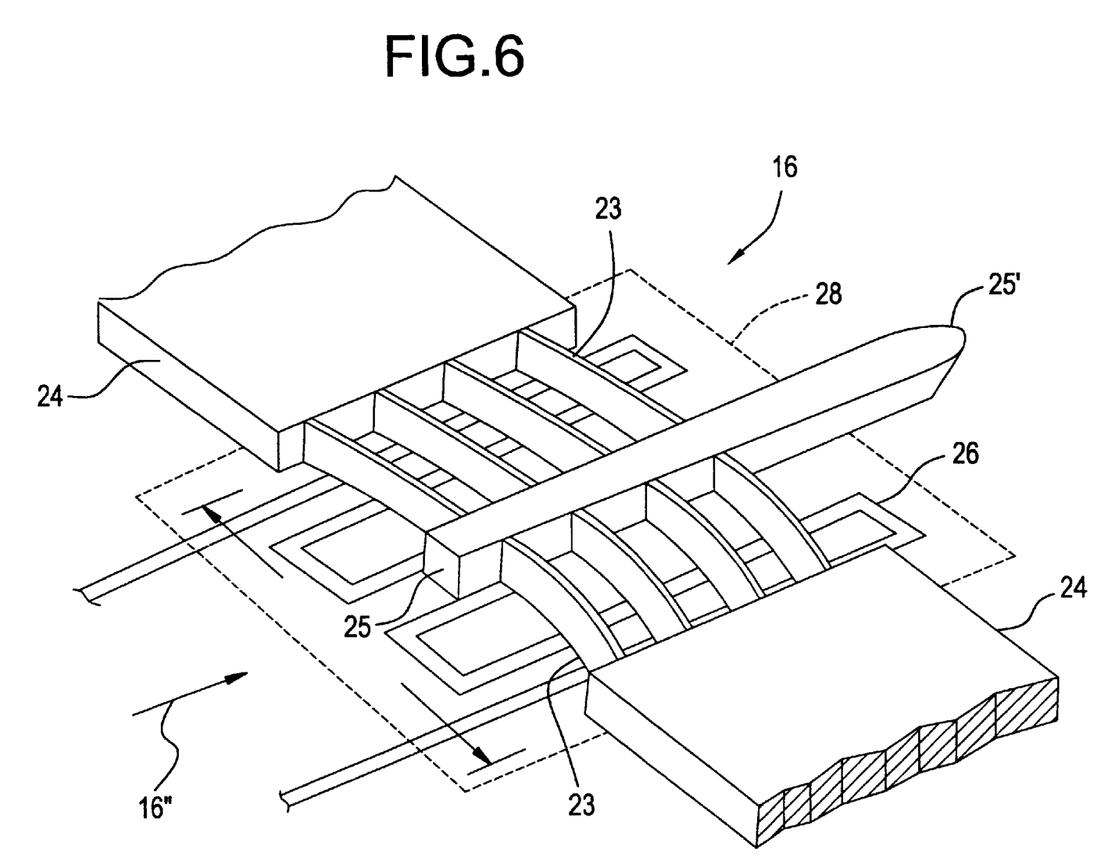
FIG. 6 is a perspective view of a thermal arch beam actuator used as the in-plane (x-axis) actuator in the micro-aligner shown in FIG. 5A.

As illustrated in more detail in FIG. 6 with respect to the y-direction thermally actuated arch beam actuator 16, and as equally applicable to x-direction thermally actuated arch beam actuator 15, the thermally actuated arch beam actuator 16 generally includes a plurality of arches 23 supported between a pair of side support structures or pads 24 and suspended over diaphragm 28 formed in the underlying surface 14' of substrate 14 by undercut etching of the substrate 14. Advantageously, such actuators 16 (and 15) are comprised of a single material so that they are less expensive and less complicated to fabricate than, for example, bimorphic actuators made from two materials. Although FIG. 6 illustrates actuator 16 as having four arches 23, the number of arches 23 may vary (e.g., 2–20). A cantilever beam 25 extends across the arches 23. The cantilever beam 25 has a rounded distal end 25" oriented towards the alignment housing sidewall 4 (or 5).

When heated by a heater 26, thermal expansion causes the arches 23 to bend in a direction determined by their orientation, namely, in the direction 16" indicated in FIG. 6 (and FIG. SB). As a result of the bending of arches 23, beam 25 moves along direction 16" towards and ultimately against sidewall 4 of the alignment housing 17 (see FIG. 5A). In a preferred embodiment, a polysilicon resistive heater positioned, or located, in close proximity to each actuator 15 or 16 (i.e., directly below the arches 23) embodies the heater 26. Thus, heater 26 provides heat to arches 23 when electrically stimulated for urging beam 25 towards and ultimately against bearing surface 4.

As a result, each beam 25, 25' of the respective thermally actuated arch beam actuators 16, 15, respectively, can be electronically controlled to independently apply a positive force to the carrier 14 effective to overcome the opposite biasing force of the associated retainer springs 21, 22, respectively, causing the carrier 14 to move in the opposite direction to the direction of force being applied by either beam 25, 25' against a sidewalls 4, 5 of the alignment housing 17. This allows for controlled positioning of the carrier 14 relative to an optoelectronic device 112 (112') (and the alignment housing base 9) in an in-plane direction. The top surface of base 9 and the bottom surface of carrier 14 are preferably polished which reduces friction between the two features. Alternatively, the bottom surface of movable carrier 14 is coated with TEFLON® in order to reduce frictional forces between the top surface of a base 9 and the bottom surface of carrier 14.

In general, the direction of arches 23 determines the direction in which actuator 16 (or 15) bends, or deflects, and the amount of this movement is a function of the current supplied to polysilicon resistive heater 26. Thus, controlling the current supplied to heater 26 controls the deflection of actuator 16 and, consequently, controls the position of carrier 14 relative to an optoelectronic device 112 (112'). Accordingly, in-plane microactuators 15 and 16 controllably position carrier 14 relative to an optoelectronic device 112 (112') to precisely align the optical fiber 120 in groove 20 (or as bonded to an LIGA channel 20) with an associated optoelectronic device 112 (112') in the respective x- and y-directions.

As also illustrated in FIG. 5A, micro-aligner 10 has connections or leads 2 to a current supply (not shown) which supplies current to the heaters 26 (e.g., polysilicon heaters) to resistively heat the respective arch beam actuators 15, 16. Return lead 2' is connected to bonding pad 3'. In one embodiment, the leads 2 can extend to respective pins of a hermetically sealed package, such as described in U.S. Pat. No. 5,602,955, which teachings are incorporated herein by reference. In order to facilitate this electrical stimulation of heaters 26, bonding pads 3 and 3', preferably thin films of a conductive material (e.g., gold), are formed on opposite end portions of the resistive element of each heater 26 for connection to the leads 2 from the current supply. Preferably, the heaters 26 can comprise a resistive element having a serpentine-pattern beneath the arches 23 of each in-plane microactuator 16 (and 15), which heats when energized with current. A cavity is provided by etching the underside of carrier 14 below a portion of each in-plane actuator 15 and 16 to form diaphragm 28 (see FIG. 6) to help thermally isolate heaters 26 from the rest of micro-aligner 10.

As shown in FIG. 5A, for example, backstops 27 and 27' are located on carrier 14 behind both the opposite distal ends of beam 25 and beam 25', respectively, to delimit the amount of return movement of respective beams after distension prevent the arches from buckling when the beam returns.

In another embodiment of this invention, the x-direction actuator 15 and y-direction actuator 16 can be bimorphic actuators, such as the type described in U.S. Pat. No. 5,602,955, which teachings are incorporated herein by reference.

To induce out-of-plane positioning alignment of the optical fiber 120 with an optoelectronic device 112 (112') in a third direction, i.e., the z-axis direction indicated in FIG. 5A, that is orthogonal to the aforesaid two in-plane (x,y) directions, a third microactuator 19 is provided on the carrier 14 which, when activated, effectively deflects the carrier 14 upward in a normal direction away from the direction of the alignment housing base 9. This three axes active fiber micro-aligner 10 enables the precise alignment of an optical fiber with an optical device, such as a laser diode or another optical fiber, located off but immediately adjacent the carrier 14.

Preferably, the z-direction actuator 19 is a bimorphic-type actuator formed on the carrier 14. Advantageously, the bimorphic actuator 19 is adapted to controllably position carrier 14 in the z-direction relative to the base 9 of the alignment housing 17 and an optoelectronic device 112 (112'). In general, layers of two materials which respond differently to thermal stimulation embody bimorphic actuator 19. In general, a resistive heater is sandwiched between the two layers to controllably introduce the thermal stimulation.

Figure 7A:
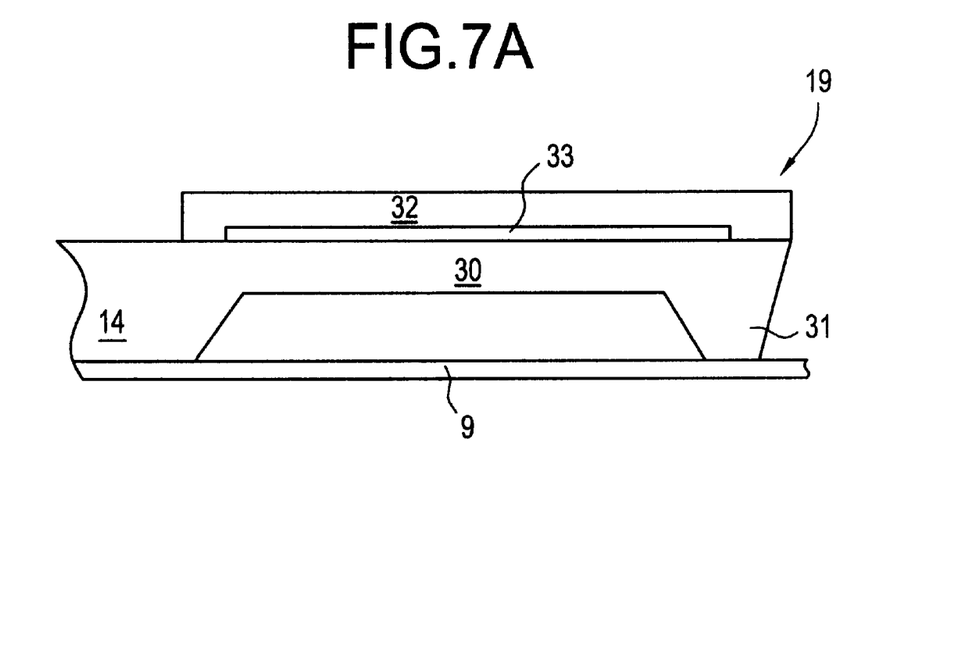
FIG. 7A is a cross section of the z-axis bimorphic micro-actuator used in the micro-aligner subsystem shown in FIG. 5A taken along line A–A' of FIG. 5B when the z-axis actuator is at rest.

For example, FIG. 7A shows the z-axis actuator 19 when at rest. The z-axis actuator 19 includes a diaphragm structure 30 having a distal end 31 and the diaphragm structure is formed by undercut etching a portion of the silicon substrate 14, as defined between two parallel relief channels 19' (see FIG. 5A) formed through carrier substrate 14. Distal end 31 of z-axis actuator 19 is adjacent yet spaced from sidewall 4 of alignment housing 17. The processing used to form cantilever-like structures in the surface of a silicon substrate by anisotropic wet etching is known to those skilled in the art. The bimorphic actuator 19 includes two layers of materials which have different coefficients of thermal expansion, such as a layer of nickel 32 (or copper) disposed on silicon, and the metal layer has a larger coefficient of thermal expansion than silicon. The thin film resistive heater 33 is formed on the silicon substrate 14 in the desired pattern by similar techniques as described elsewhere herein relative to resistive heaters 26 used for the in-plane microactuators 15 and 16.

In order to facilitate electrical stimulation of the bimorphic actuators, bonding pads 18 (FIG. 5A), typically comprised of a conductive material, such as gold, can be formed on opposed end portions of the bimorphic actuator 19 such that an electrical current can be established therebetween via leads 2" connected to a power supply (not shown). Then, referring again to FIG. 7A, the metallic layer 32 can be deposited on the silicon 14 and thin film heater 33 by a variety of methods, including preferential sputtering, directed evaporation, and electroplating, with departing from the spirit and scope of the present invention.

Figure 7B:
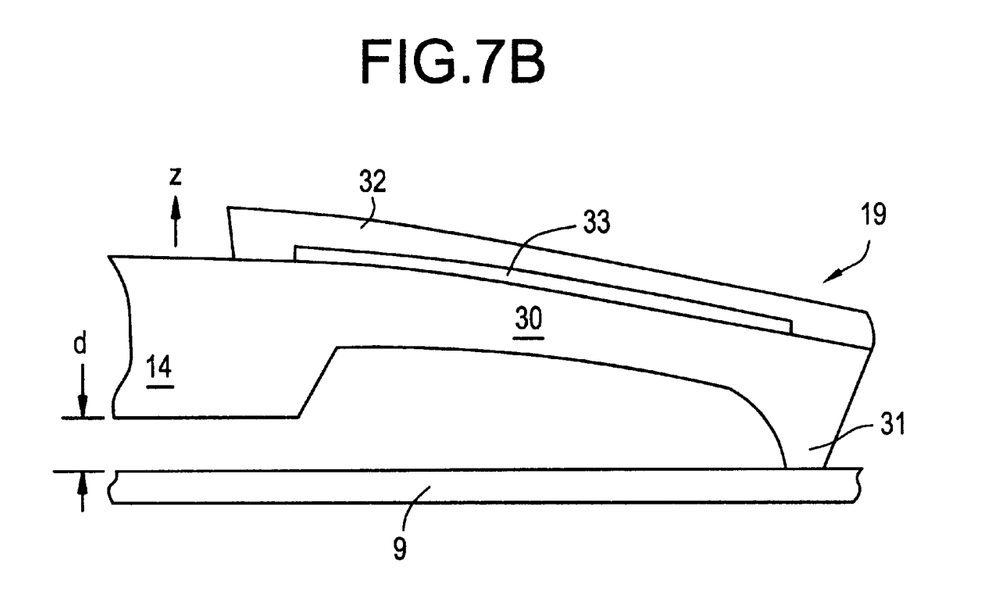
FIG. 7B is a cross section of the z-axis bimorphic micro-actuator used in the micro-aligner subsystem shown in FIG. 7A taken along line A–A' of FIG. 5B when the z-axis actuator is activated.

FIG. 7B is a cross section of the z-axis microactuator of z-axis actuator taken along direction A–A' of FIG. 5B when the z-axis actuator is activated by inducing thermal stimulation through resistive heater 33. Upon heating via thin film resistive heater 33, the distal end 31 of the diaphragm 30 is caused to deflect downward, which, in turn, creates a counterforce pushing upward the carrier 14 (via diaphragm 30) a displacement distance 'd' in the z-direction which effectively displaces the optic fiber 12 positioned thereon in the z-direction. In this embodiment, the micro-aligner 10 includes current supply means for providing current to the resistive heater 33 of bimorphic actuator 19. In one embodiment, this can be accomplished by leads 2" extending to respective pins of a hermetically sealed package, such as described in U.S. Pat. No. 5,602,955, which teachings are incorporated herein by reference.

In this embodiment, the amount of the deflection of bimorphic actuator 19 is proportional to the magnitude of the electrical stimulation. By therefore controlling the current supplied to the bimorphic actuator 19, the amount of the bending or deflection and, consequently, the position of the carrier 14 relative to the base 9 (and an optoelectronic device 112 (112')) can be controlled since the amount of bending is generally proportional to the current supplied to the resistive heater of the bimorphic actuator. Sufficient resistive heating can be generally provided by relatively small amounts of the current, such as 10 mA, thereby reducing the power requirements for the microstructure 19 of this embodiment.

The micro-aligner subsystem 10 having the construction described above is able to displace optical fiber 120 greater than 10 microns in any one of the x- or y-directions and displace an optical fiber greater than 100 $\mu$m in the z-direction, at forces of >30 mN in the x- or y-directions and at a force of >100 mN in the z-direction, and a power of <1.0 watt. The movable carrier 14 can have a square or rectangular surface geometry, as indicated in FIG. 5A, although it will be understood that the configuration of the carrier 14 is not limited thereto as long as the above functional requirements are met.

As an exemplary processing scheme for fabricating micro-aligner 10, fabrication of the micro-aligner carrier chip begins with definition of a PECVD silicon nitride layer 14" (see FIG. 5A) on a silicon wafer, to provide carrier substrate 14, which are later etched via bulk etching to form the cantilever shaped z-axis actuator 19 and the thinned substrate diaphragm regions 28 (by etching recesses into the backside of the carrier 14) at areas below the resistive heaters 26 and thermally actuated arch beam actuators 15 and 16. A low stress PECVD silicon nitride layer patterned on both sides of the silicon wafer is used for this purpose. As is known in the art, the silicon nitride layer forms a base layer which adds strength to the structure as well as a chemical barrier or etch-stop layer.

The surface micromachine layers are then patterned to form the thermal isolation structures and microheaters for the thermally actuated beam actuators 15 and 16. A thick electroplated nickel layer is patterned using the LIGA (German acronym which translates to Lithography, Plating, and Molding) technique. As known to those skilled in the art, LIGA processes are based on a combination of lithography, electroforming and molding. In fact, the acronym LIGA is derived from the German translation of lithography, electroforming and molding, namely, Lithography, Galvanoformung and Abformung. Advantageously, LIGA processes may be used to obtain relatively large height-to-width ratios which permit fabrication with precise tolerances. Thus, this step relies upon synchrotron based deep x-ray lithography.

A key aspect of LIGA patterning is the ability to define high aspect ratio structures, which is crucial for obtaining actuation in the plane of the carrier chip and for defining corresponding spring structures with high in plane compliance. LIGA also permits plating heights which are sufficiently thick to form passive fixturing guides for the fiber, precise edge reference structures, and provides convenient definition of conductor paths for actuator control input. Optical lithography ensures excellent alignment of reference structures with fiber guides and thereby provides assembly alignment accuracy within the capture range of the microactuators.

Following LIGA patterning, the movable portions of the nickel structures are released via sacrificial etching. That is, after forming the nickel structures in the surface of carrier 14 via LIGA, chemical etch undercuts are provided to selectively release nickel structures from the carrier 14. By properly timing the etch, some nickel structures are completely undercut and, thus, released, while others remain attached to the substrate. In a preferred embodiment of the present invention, fixed structures, e.g., features 3, 3', 18, 21, and 22 in FIG. 5A, remain attached to substrate 14 while other structures such as arches 23 and beams 25, 25' of in-plane microactuators 15 and 16 are released by undercut etching. This result can also be accomplished by using a masked sacrificial layer.

The bulk silicon wafer of substrate 14 is then subjected to anisotropic etching to cut away portions of the substrate 14 located below diaphragm area 28 (FIG. 6) and thermally relieve the polysilicon heaters 26, using the silicon nitride layer as an etch stop. According to the invention, etching performed on the bottom side of substrate 14 stops at nitride layer 14" which forms the diaphragm 28 on the top surface of substrate 14. Advantageously, this arrangement thermally isolates heater 26 from the other components of micro-aligner 10 and the alignment housing 17. For example, by thermally isolating optical fiber 120 from heater 26, optical fiber 120 may be maintained at a desired temperature to prevent temperature fluctuation from altering or otherwise affecting its alignment. In addition to providing thermal isolation, the etching causes a greater percentage of the heat provided by heater 26 to be transferred to actuator 15 or 16. As a result, actuators 15 and 16 have improved deflection response and efficiency. The resulting process merges surface and bulk silicon micromachining with nickel surface micromachining via the LIGA technique.

The most real estate taken up by the anisotropic bulk micromachining is attributable to making the heaters and relief of the z-actuator. These area requirements can be eliminated by using reactive ion etching (RIE) of the silicon which can achieve through wafer etching with aspect ratios of 40:1. The micro-aligner 10 can require on the order of 1 mm$^2$ of real estate, meaning thousands of micro-aligners such as described herein can be formed per wafer surface.

Following wafer level fabrication, the individual micro-aligner devices are separated from each other using conventional dicing, and then they can be packaged as described herein. The optic fiber 120 can be aligned with an optical device 112 (112'), such as a laser diode, using the 3-axis micro-aligner 10 integrated in a hermetic sealed package prior to or following the hermetic sealing of the package. The microactuators 15, 16 and 19 (FIG. 5A) can be powered via conventional wirebonding, such that described in U.S. Pat. No. 5,602,955, which teachings are incorporated herein by reference.

Micro-aligner 10 can be first bonded into a package 102 using standard opto-electronic placement techniques within the actuator range (viz., about 10 $\mu$m). The laser diode of the device submount 108 can be mounted on the non-moving portion of the substrate 104 using passive LIGA stops to pre-position the laser in front to the fiber. After the micro-aligner is placed into the package, and lensed fiberoptic or other optical component can be brought in and bonded into the fiber holding structure of micro-aligner 10. After the fiberoptic is bonded, the micro-aligner 10 can be actuated via microprocessor control to align the fiber to the laser diode. The geometry of the inventive microaligner generally brings the optical elements into exact alignment within about 10 $\mu$m or less, so the motion of the carrier 14 over 30 microns is adequate to obtain fine alignment. The inventive micro-aligner 10 can be used for either continuous, or for align-and-fix pigtailing. The relatively large stage on which the fiber is attached provides a convenient way to fix the stage, and the fiber, in the aligned position. Since all structures are formed via microlithographic patterning, the accuracy of their placement relative to each other is limited only by accuracy of the photomask patterning tool. The current microlithography equipment can provide better than 0.2 $\mu$m placement accuracy which is more than adequate resolution to accommodate the inventive optical fiber alignment and locking system. Microactuators on the chip act on either an internal fiber support stage or external reference structures defined in the package. In both cases, the actuators must produce sufficient force to overcome the constraints of friction, fiber bending, and the mass of the chip itself. The inventive packaging technology literally pushes the fiber into position to align it with its coupled device and holds it in place during bonding provided by internal heaters. The system is programmed to perform all necessary in-package alignments rapidly and inexpensively.

As can be appreciated, the invention eliminates the need for expensive external automated precise fiber alignment systems in the optoelectronic packaging field. The inventive integrated in-package optical waveguide micro-aligner and fixing assembly can be used for active optics backplane interconnects, smart optical splices, optoelectronic modules for high speed data communications, analog and digital fiber-optic links (e.g., network, antenna remoting), high speed signal processing, and so on), and fly-by-light and smart skin architectures using fiber-optics, and so forth.

In view of the above, it will be seen that the several objects of the invention are achieved and other advantageous results attained.

As various changes could be made in the above constructions and methods without departing from the scope of the invention, it is intended that all matter contained in the above description and shown in the accompanying drawings shall be interpreted as illustrative and not in a limiting sense.

What is claimed is:

1. An alignment and locking system for aligning an optical fiber with an optoelectronic device housed inside an optoelectronic package and locking the optical fiber in place, said system comprising:

an optoelectronic package including:
sidewalls and a device floor defining an enclosure,
an optoelectronic device housed inside the enclosure,
a micro-aligner positioned inside the enclosure and overlying the device floor,
a heater overlying the device floor; and
a solder preform overlying said heater and positioned between the optoelectronic device and the micro-aligner, and the optical fiber being secured upon the micro-aligner and positioned adjacent said solder preform, said solder preform having a known melting temperature and being attached to said heater;

a microprocessor;

a power source for supplying electrical power to said heater suitable for causing said solder preform to melt based on power control signals received by said power source from said microprocessor;

an instrument for determining the amount of light passing between said optical fiber and said optoelectronic device and supplying related received power signals to said microprocessor; and wherein the micro-aligner moves the optical fiber into optical alignment with the optoelectronic device based on alignment control signals received from said microprocessor, said alignment control signals being based on said received power control signals, and said micro-aligner aligning said optical fiber while said solder preform is in a molten state.

2. The system of claim 1, wherein said micro-aligner manipulates said optical fiber along three orthogonally oriented axes.

3. The system of claim 2, wherein said micro-aligner comprises:

a stationary alignment housing comprising a base and four housing sidewalls upstanding from said base defining a rectangular-shaped recess;

a carrier having a surface plane and holding the optical fiber to be positioned in alignment with the optoelectronic device, and where said carrier is positioned within said recess defined by the stationary alignment housing;

first and second microactuators provided on the carrier for effecting in-plane alignment of the optical fiber with the optoelectronic device in either or both of the two orthogonal in-plane directions in which said in-plane microactuators, when either is activated, exerts a force on a housing sidewall of said alignment housing sufficient to overcome the normal and opposite biasing force created by first and second respective associated biasing means included on said carrier to cause movement of the carrier in one of the in-plane directions, where said first and second biasing means are provided on opposite sides of said carrier relative to said first and second in-plane microactuators, respectively, with each said biasing means biased against the stationary alignment housing to thereby impose opposing counter forces against which the respective first and second in-plane microactuators on the carrier must act and overcome to cause said in-plane movement of said carrier;

and a third microactuator provided on the carrier which, when activated, effectively deflects the carrier upward in a direction away from the base.

4. The system of claim 3, wherein the carrier includes an optical fiber holding means selected from the group consisting of an optic groove and a LIGA channel, for receiving the optical fiber and for maintaining the optical fiber in a fixed relation to the carrier.

5. The system of claim 1, wherein, prior to melting, said solder preform is sized to receive said optical fiber.

6. The system of claim 1, wherein said heater comprises a thin metallic resistor/heater, and said microprocessor controls the magnitude and duration of the voltage applied to said thin metallic resistor/heater by said power source.

7. The system of claim 1, wherein said solder preform comprises a combination selected from the group consisting of tin and silver, tin and antimony, and gold and tin.

8. The system of claim 1, wherein the optoelectronic device is selected from the group consisting of a light emitting diode, a laser diode, and a photodiode.

9. A method of aligning an optical fiber with an optoelectronic device housed inside an optoelectronic package and locking the optical fiber in place, said method comprising the steps of:

providing an optoelectronic package including:
sidewalls and a device floor defining an enclosure,
an optoelectronic device housed inside the enclosure,
a micro-aligner positioned inside the enclosure and overlying the device floor,
a heater overlying the device floor;
a solder preform overlying said heater and positioned between the optoelectronic device and the micro-aligner, said solder preform having a known melting temperature and being attached to said heater;

securing an optical fiber upon the micro-aligner;

positioning the optical fiber adjacent said solder preform located atop said heater positioned overlying the device floor;

supplying electrical power to said heater for a predetermined time period sufficient for the heater to heat the solder preform to the melting point of the solder to render the solder preform molten;

passing light between said optical fiber and said optoelectronic device while said solder preform is in the molten state;

detecting the amount of light passing between said optical fiber and said optoelectronic device while said solder preform is in the molten state;

automatically manipulating the position of said optical fiber relative to said optoelectronic device using said micro-aligner so as to increase the amount of light passing between said optical fiber and said optoelectronic device while said solder preform is in the molten state; and solidifying said solder preform.

10. The method of claim 9, wherein said micro-aligner automatically manipulates said optical fiber along three orthogonally oriented axes during said automatic manipulating step.

11. The method of claim 9, wherein said provided micro-aligner comprises:

(i) a stationary alignment housing comprising a base and four housing sidewalls upstanding from said base defining a rectangular-shaped recess;

(ii) a carrier having a surface plane and holding the optical fiber to be positioned in alignment with the optoelectronic device, and where said carrier is positioned within said recess defined by the stationary alignment housing;

(iii) first and second microactuators provided on the carrier for effecting in-plane alignment of the optical fiber with the optoelectronic device in either or both of the two orthogonal in-plane directions in which said in-plane microactuators, when either is activated, exerts a force on a housing sidewall of said alignment housing sufficient to overcome the normal and opposite biasing force created by first and second respective associated biasing means included on said carrier to cause movement of the carrier in one of the in-plane directions, where said first and second biasing means are provided on opposite sides of said carrier relative to said first and second in-plane microactuators, respectively, with each said biasing means biased against the stationary alignment housing to thereby impose opposing counter forces against which the respective first and second in-plane microactuators on the carrier must act and overcome to cause said in-plane movement of said carrier; and (iv) a third microactuator provided on the carrier which, when activated, effectively deflects the carrier upward in a direction away from the base.

12. The method of claim 11, wherein said automatic manipulating step comprises positioning the carrier relative to the optoelectronic device by actuating one or more of the first, second, and third microactuators, and precisely aligning the optical fiber with the optoelectronic device.

13. The method of claim 9, wherein said optical fiber is automatically manipulated along each axis of a plurality of orthogonal axes by said micro-aligner by:

moving the optical fiber relative to the optoelectronic device in steps in one direction;

detecting the amount of light transmitted between the optical fiber and said optoelectronic device after each step; and reversing the direction of movement of the optical fiber relative to the optoelectronic device if the amount of light detected after the most recent step is less than the amount of light detected after the immediately preceding step.

14. The method of claim 9, wherein the optoelectronic device is provided by selecting from the group consisting of a light emitting diode, a laser diode and a photodiode.

15. The method of claim 9, wherein said solder preform is provided, prior to melting, and said solder preform solidifies, after said melting and manipulating steps, in contact with exterior surface portions of the optical fiber.

* * * * *